(12) United States Patent
Leippe et al.

(10) Patent No.: US 8,356,282 B1
(45) Date of Patent: Jan. 15, 2013

(54) INTEGRATED DEVELOPMENT ENVIRONMENT FOR THE DEVELOPMENT OF ELECTRONIC SIGNAL TESTING STRATEGIES

(75) Inventors: William Harold Leippe, Coram, NY (US); William Biagiotti, St. James, NY (US); Eli Levi, Dix Hills, NY (US); Robert Spinner, East Northport, NY (US)

(73) Assignee: Advanced Testing Technologies, Inc., Hauppauge, NY (US)

( * ) Notice: Subject to any disclaimer, the term of this patent is extended or adjusted under 35 U.S.C. 154(b) by 0 days.

(21) Appl. No.: 13/237,304

(22) Filed: Sep. 20, 2011

Related U.S. Application Data

(60) Provisional application No. 61/533,837, filed on Sep. 13, 2011.

(51) Int. Cl.
*G06F 9/44* (2006.01)

(52) U.S. Cl. ......... 717/125; 717/131; 717/127; 717/130

(58) Field of Classification Search ................... 717/100, 717/124–127, 130–135
See application file for complete search history.

(56) References Cited

U.S. PATENT DOCUMENTS

| | | | |
|---|---|---|---|
| 6,396,536 B1 | 5/2002 | Howell et al. | |
| 6,532,571 B1 * | 3/2003 | Gabrielson et al. | 716/106 |
| 7,180,477 B2 | 2/2007 | Howell | |
| 7,228,478 B2 * | 6/2007 | Swaminathan | 714/738 |
| 7,253,792 B2 | 8/2007 | Biagiotti et al. | |
| 7,289,159 B1 | 10/2007 | Biagiotti et al. | |
| 7,493,597 B2 * | 2/2009 | Hefner | 717/124 |
| 7,495,674 B2 | 2/2009 | Biagiotti et al. | |
| 7,768,533 B2 | 8/2010 | Biagiotti et al. | |
| 2003/0046668 A1 * | 3/2003 | Bowen | 717/131 |
| 2006/0190771 A1 * | 8/2006 | Hefner | 714/38 |
| 2009/0319987 A1 * | 12/2009 | Bartz | 717/109 |
| 2011/0088011 A1 * | 4/2011 | Ouali | 717/105 |

OTHER PUBLICATIONS

Fuentes et al., Wind Turbine Modelling: Comparision of Advanced Tools for Transient Analysis, Dec. 5, 2006.*
Abielmona et al., An Experimental Study of the Accuracy of Multiple Power Estimation Method, Jul. 20, 2004.*
Abielmosa et al, The Architectue of an IP over ATM Processor, Apr. 2, 1001.*

* cited by examiner

*Primary Examiner* — Lewis A Bullock, Jr.
*Assistant Examiner* — Tina Huynh
(74) *Attorney, Agent, or Firm* — Brian Roffe

(57) ABSTRACT

Integrated application of specific CASE tools that allow a user to accomplish instrument programming and control when generating, capturing and/or analyzing electronic signals, and in doing so automatically generate automation code to replicate a desired instrument setup, acquisition, analysis and sequence control. The CASE tools include, but are not limited to, GUI instrument programming tools, an electronic signal redisplay tool, a waveform analyzer tool, automated code generation tools, macro generation tools, macro and sequence playback tools, a test creation tool, a test sequencer tool, a decision engine that may be part of the test sequencer tool, and test result data logger. A method for analyzing electronic signals that enables multiple tests to be performed after a single signal acquisition, and enables results from the multiple tests to be analyzed is also disclosed.

20 Claims, 6 Drawing Sheets

FIG. 2

```xml
<?xml version="1.0" ?>
<!-- ID="i2tmacro" Date="08/5/2011" Filename="i2tmacro.xml" -->
<Schema name="i2tmacro" xmlns="urn:schemas-microsoft-com:xml-data" xmlns:dt="urn:schemas-microsoft-com:datatypes">
  <I2TMacro>
    <Instruments>
      <Instrument>
        <SymbolicName />
        <Commands>
          <Command>
            <Name />
            <Parameters>
              <Parameter>
                <Name />
                <Value />
              </Parameter>
            </Parameters>
          </Command>
        </Commands>
        <Connections>
          <Connection>
            <InstrumentPin />
            <ConnectionType />
            <InterfacePin />
          </Connection>
        </Connections>
      </Instrument>
    </Instruments>
  </I2TMacro>
</Schema>
```

FIG. 3

```xml
<?xml version="1.0" ?>
<!-- ID="i2ttest" Date="08/5/2011" Filename="i2ttest.xml" -->
<Schema name="i2ttest" xmlns="urn:schemas-microsoft-com:xml-data" xmlns:dt="urn:schemas-microsoft-com:datatypes">
  <Tests>
    <Test>
      <Name />
      <Macros>
        <Macro>
          <Name />
        </Macro>
      </Macros>
      <Measurement>
        <Instrument>
          <SymbolicName />
        </Instrument>
        <MeasurementFunction>
          <Name />
          <Parameters>
            <Parameter>
              <Name />
              <Value />
            </Parameter>
          </Parameters>
        </MeasurementFunction>
        <MeasurementParameter>
          <Name />
        </MeasurementParameter>
      </Measurement>
      <UpperLimit>
        <Value />
      </UpperLimit>
      <LowerLimit>
        <Value />
      </LowerLimit>
    </Test>
  </Tests>
</Schema>
```

FIG. 4

```xml
<?xml version="1.0" ?>
<!-- ID="i2tsequence" Date="08/5/2011" Filename="i2tsequence.xml" -->
<Schema name="i2tsequence" xmlns="urn:schemas-microsoft-com:xml-data" xmlns:dt="urn:schemas-microsoft-com:datatypes">
  <TestSequence>
    <Tests>
      <Test>
        <Name />
        <Macros>
          <Macro>
            <Name />
          </Macro>
        </Macros>
        <Measurement>
          <Instrument>
            <SymbolicName />
          </Instrument>
          <MeasurementFunction>
            <Name />
            <Parameters>
              <Parameter>
                <Name />
                <Value />
              </Parameter>
            </Parameters>
          </MeasurementFunction>
          <MeasurementParameter>
            <Name />
          </MeasurementParameter>
        </Measurement>
        <UpperLimit>
          <Value />
        </UpperLimit>
        <LowerLimit>
          <Value />
        </LowerLimit>
      </Test>
    </Tests>
    <Sequence>
      <Test>
        <Name />
      </Test>
    </Sequence>
  </TestSequence>
</Schema>
```

INTEGRATED DEVELOPMENT ENVIRONMENT FOR THE DEVELOPMENT OF ELECTRONIC SIGNAL TESTING STRATEGIES

CROSS REFERENCE TO RELATED APPLICATION

This application claims priority under 35 U.S.C. §119(e) of U.S. provisional patent application Ser. No. 61/533,837 filed Sep. 13, 2011, incorporated by reference herein.

FIELD OF INVENTION

The present invention relates generally to the programming, documentation and automation of instrumentation to generate, and then capture and analyze signals using a graphics-based integrated instrumentation toolset (hereinafter referred as the $I^2T$). The present invention also relates to a method for analyzing electronic signals in which based on a single acquisition of the electronic signal, multiple tests can be conducted on the signal and the results of the tests or measurements derived during the tests can be analyzed.

The present invention relates more specifically to the presence of computer aided software engineering (CASE) tools in the integrated toolset that improve the quality, reliability, transportability and accuracy of complex test programming requirements. The integrated application employs various technologies such as a graphical user interface or interfacing (GUI), templates, forms, macros, data structures and extensible markup language (XML) data exchange to correlate the users' interactions with the tools within the toolset programming signal generators and signal analyzers to accomplish generation, acquisition and evaluation of signal properties, such as voltage and time; automatically generating code to replicate or playback the user actions performed within the $I^2T$ session. The code automatically generated may be exported as ASCII text for use in other applications. $I^2T$ saves the same session information as macros to be used at a later time by the toolset or other applications. Stored macros increase trouble-shooting throughput by automating instrument setup. Multiple macros can be played back as a recorded sequences or test scripts. Recorded sequences or test scripts are exportable via the automated code generation tool and can be initiated through the toolset's application program interface (API). The users accomplished work captured through their interactions with the toolset GUI can be replayed internally or invoked through a program call in a Test Executive (TE) or Test Sequencer (TS) application using, for example, its native language or programming paradigm context.

BACKGROUND OF THE INVENTION

Programming of instrumentation can be a tedious and/or complex task. The test engineer, or other instrumentation programmer, must understand all aspects of the signals that need to be generated, captured and analyzed and how to use the instruments available to support and achieve their objectives. Signals are typically described in voltage, frequency and timing parameters or relationships. Prompting the test engineer with visual cues, such as in a GUI, the programming of instrumentation to create capture and analyze signals is intuitive. Reducing the complexities of programming the instrumentation naturally focuses the test engineer on the objectives of signal characteristics and content.

The reduction in programming complexity for the test engineer makes their task easier, consuming less of their time on the byproduct overhead task of programming which is a necessity associated with the use of instrumentation automation. Requirements to provide support documentation, such as flow charts and/or test diagrams, are generated automatically by $I^2T$. This ensures the quality, reliability and accuracy of complex test programming requirements and improves the efficiency of the test engineer.

Even with thorough knowledge of signals, programming instrumentation is still a time-consuming task. To automate instrument programming, the test engineer must have knowledge of not only what to program but they also need to have knowledge on how to send programming information to the instruments. Accomplishing instrument programming is environment-dependent but the majority of today's common system architectures provide documentation for each instruments API or they document the native instrument language.

Two dominant instrument class types exist from a programming perspective; register-based and message-based. Register-based instrument manufacturers document their API in the programmer's/user's guide or provide a register map and description of how to use the various registers to automate control programmatically in their programmer's/user's guide. Message-based instruments document a native instrument language for automating program control using a word serial protocol.

The most common implementation today is the Standard Commands for Programmable Instruments (SCPI) standard, so message-based instrument manufacturers document their API in the programmer's/user's guide and/or document their native SCPI language and how to automate programmatic control of an instrument in their programmer's/user's guide. If one of these instrument classes and/or common practices is not available for the instrument, then the programming task becomes more difficult.

Very often, the programmer's/user's guide set forth the critical setup criteria for and/or mutual and mutually exclusive instrument rules for modes of operation that must be adhered to for proper functionality. If the test engineer is not an experienced programmer, then the task can become exponentially more difficult. As the programming task becomes more of a challenge, adverse risk to the quality, reliability, transportability and accuracy of the code simultaneously compounds.

To successfully accomplish programming, an instrument requires the user to evaluate and know each function within the API or SCPI language and all the parameters related to the particular functions necessary in order to automate instrument control. To save time, reduce adverse risk and increase code quality, reliability, transportability and accuracy, code to automate program control of each instrument is generated automatically as the user clicks through the $I^2T$'s graphical user interface. The automatically generated code can be inserted into the desired editor, interpreter compiler or programming paradigms ensuring the instruments automated control is executed exactly the way the test engineer accomplished the programming task using the $I^2T$ graphical user interface.

A need often arises for a reliable means for a user, in particular an inexperienced programmer, to accomplish useable programming code themselves. By using the $I^2T$'s graphical user interface described in detail below, this need is met.

In the realm of Automatic Testing, a user may require a signal generator and/or a signal analyzer to ascertain the operational quality/integrity or diagnose faulty elements in various electronic devices. In doing this, many tests have to be written which then must be logically executed in the designed sequence to obtain one or more desired test objectives. The I²T can solve both of these problems. The tests can be written using the macro generation as well as the test creation tool. The I²T solves the sequencer problem allowing the user to define which tests are to be run and what order to run them. Additionally, I²T will process and log the test results.

SUMMARY OF THE INVENTION

An object of the present invention is to provide an integrated application of specific CASE tools to intuitively allow the user to accomplish instrument programming and control when generating, capturing and/or analyzing electronic signals; and in doing so automatically generate the necessary automation code to replicate the desired instrument setup, acquisition, analysis and sequence control. The CASE tools may include, but are not limited to, GUI instrument programming tools, an electronic signal redisplay tool, a waveform analyzer tool, automated code generation tools, macro generation tools, macro and sequence playback tools, a test creation tool, a test sequencer tool, a decision engine that may be part of the test sequencer tool, and test result data logger. The tools may be embodied in non-transitory computer-readable media, and executed by a processor, with an arrangement including the tools, processor and other electronic equipment necessary for signal handling, processing and/or management.

In one embodiment, the instrument programming tool consists of a graphical user interface (often referred to herein as a GUI), or a plurality of GUI's, that allows the user to program specific properties of a electronic signal to be generated and/or to program specific properties of a signal analyzer to capture and subsequently analyze an incoming electronic signal.

The electronic signal redisplay tool is a graphical user interface that allows the user to display a signal captured by a signal analyzer. This tool also has the ability to display various qualitative and quantitative properties of the captured waveform.

Another tool that the I²T provides is a signal analyzer graphical user interface that acts as a software-based continuous signal oscilloscope which can perform comparative analysis on the captured signal relative to golden signal or analog signature.

The code generation tool generates code to call the APIs of the instruments required as well as associated tools. The code generated is generated in a user selected programming language. The code is generated as the user is using the graphical user interfaces of the previous mentioned tools. The user has the ability to export the code generated into the environment of their choice to complete the development of computer program that utilizes applicable instrumentation.

The macro generator and playback tool is similar to the code generator tool except that it records the information programmed by the user so that the I²T can play back exactly what the user did at a later time without having to create an independent program using the exported code.

The test creation tool allows the user to generate complex tests, test sequences and test scripts using the graphical user interface. Using the graphical user interface, the user can select to measure various properties of the signal captured displayed in the signal analyzer. The test creation tool will optimize test throughput and code generated by acquiring signals once, then analyze quantitatively and qualitatively many parametric points of interest and values in the acquired signals that characterize signal integrity, producing efficient code and optimized throughput. The tool is uniquely able to maximize throughput by programming only what needs to be programmed, thus eliminating unnecessary replication of set-up commands and acquisition cycles to instruments typically embedded by test engineers in manually generated automation code.

The test sequencer tool allows the user to sequence the order of the macro tests defined using the test creation tool. A decision engine, which is part of the test sequencer, supplements the test sequencer allowing it to conditionally execute based on the GUI users conditions. More specifically, the decision engine decides or determines the status, e.g., pass or fail, of the test by analyzing the test results, e.g., by comparing measured values to limits.

The test result data logger tool processes and records any macro or test script related decision criteria. The user can completely encapsulate a functional, parametric or diagnostic test program using the I²T toolset without writing or compiling any code.

A method for analyzing signals in accordance with the invention may use the graphics-based integrated instrumentation toolset having structure as described above, or may be implemented using alternative structure that is capable of performing the same or similar functions. The method generally entails generating a plurality of macros that each provides programming for at least one instrument that acts on an electronic signal, generating a plurality of different tests each including at least one of the generated macros, and storing the generated tests in a test storage device. The electronic signal is acquired, irrespective of the time at or during which the macros are generated and tests created and stored, and the acquired electronic signal may be stored in a memory component. A processing unit then accesses the memory component in which the electronic signal is stored and the test storage device in which the tests are saved and executing one or more of the tests on the electronic signal without requiring the electronic signal to be re-acquired after executing each test, and the results of the executed tests can be analyzed. This therefore enables the processing unit or arrangement to enable analysis of measurements or results from multiple tests based on a single acquisition of a signal.

BRIEF DESCRIPTION OF THE DRAWINGS

A more complete appreciation of the present invention and many of the attendant advantages thereof will be readily understood by reference to the following detailed description of the invention when considered in connection with the accompanying drawings in which:

FIG. 2 shows the I²T Macro Generation and Playback Schema;

FIG. 3 shows the I²T Test Schema;

FIG. 4 shows the I²T Sequence Schema;

DETAILED DESCRIPTION OF PREFERRED EMBODIMENTS

Figure 1:
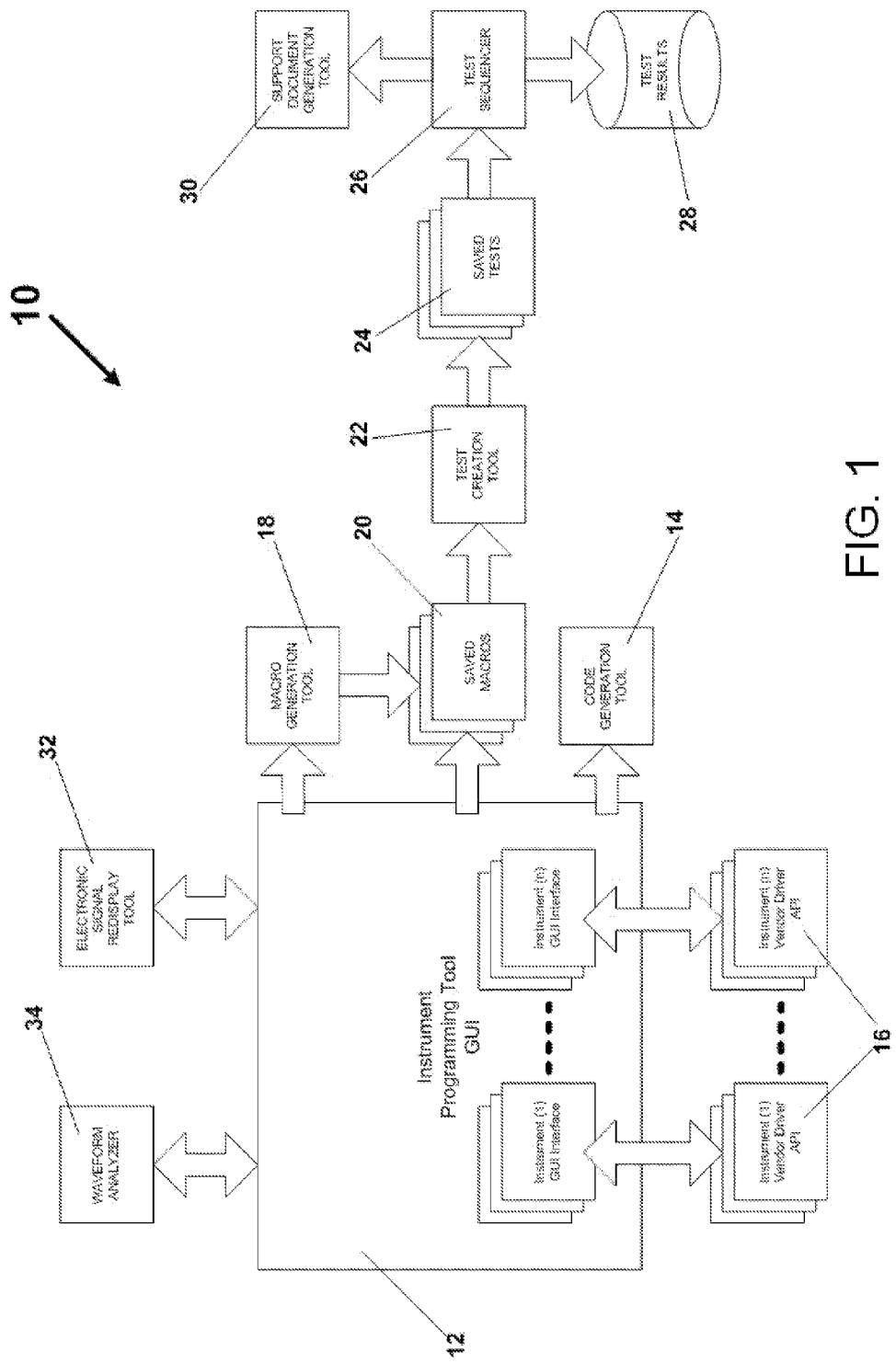
FIG. 1 is a block diagram depicting how CASE tools integrated into the invention interact in accordance with the invention.

Referring first to FIG. 1, a graphical user interface 12 for an instrument programming tool (I²T) 10 in accordance with the invention provides the means to a user to program instruments interactively. The user can graphically program distinct signal characteristics or select signal standards at a click of a button of the graphical user interface (GUI) 12, or by other single or multiple action means involving the graphical user interface 12. If required, the user then can use the graphical user interface 12 to change one or many parameters of the standard. If the user has a general signal requirement, the user can also graphically program this general requirement. FIG. 1 shows a single instrument programming tool or GUI 12, it is understood though that the invention may include a plurality of GUIs.

To accomplish the capabilities of the toolset as desired in accordance with the invention, one or more virtual instrument GUIs will control the session process. This forms the basis for the event-driven system to capture every discrete interaction between each GUI and the user/programmer and the precise order in which their actions occur. Physical instrument virtual GUIs are designed to provide a function selection/knob, panel or property box/style sheet to support every required programming aspect documented in the programmer's/user's guide. Graphically, these required programming elements are logically grouped together using standard controls, and then extended upon to provide access to every conceivable programmable item documented. This produces continuity between GUIs, menus and forms from which the intuitiveness in the virtual instruments integrated into $I^2T$ is derived.

For each interaction between the user and a GUI 12 which directs instruction to an instrument, a software interrupt is generated. Based on the selections made by the user while using the GUI 12, procedural calls are made by the main GUI control to the individual tools for which work must be accomplished for any given software interrupt.

A key capability of $I^2T$ is the ability to generate code and support documentation. To provide this capability, the architecture of the integrated application is such that the code generation tool links all the tools together. The data structures defined and used in the code generation tool 14 record and correlate the users' interactions with the GUI. Instrument programming instructions are recorded by the code generation tool 14 according to the rules established in the application.

For example, as the user interacts with the GUI 12 to program a composite video signal compliant with the RS-170 commercial standard, the enhanced Programmable Video Generator and Analyzer (ePVGA) instrument GUI complies with the rules established reporting and recording the required programming function calls and the parameters necessary to satisfy the users' GUI interactions. These programming requirements are sent to the supervisory code generation tool through the documented instrument vendor driver API definition, provided by the API 16 for each instrument vendor driver 1, ..., n. Supporting multiple standards, such as but not limited to IVI, SCR or instrument vendor specific programming API, is facilitated through the principal data structure for the code generation module defined by its primary XML schema, an example of which is shown in FIG. 2.

Additional rules exist between the application tools such that the correct programming language API reference is used when filling the data structure. When the application determines which language the user set the proper DLL is dynamically loaded.

As an added feature, the user may select to view the code generation in real time, avoiding having to manually refresh. This mode also provides instantaneous API programming references to users writing code manually. The benefits of this feature are a reduction of time to research and locate the required command(s) and, since it is generated by the GUI, integration is not necessary.

All the tools within the $I^2T$ 10 are linked to the macro generation/playback tool 18. If the user wishes to at any point during use of the graphical user interfaces, the $I^2T$ 10 provides the means for user to start recording their actions as a macro for later use. The recording of the macro is effected by the macro generation tool 18. The macro generated by the macro generation tool 18 is stored in memory as, for example, a Document Object Model (DOM) Document, as the macro recording is taking place (in real time). The macro is stored in memory as a DOM Object so that parsing and serialization techniques can be used to make changes to the macro and to save the model in a more efficient way than using a flat file or some other form of Data Structures (although other forms for storing or saving the macro may be used in accordance with the invention without deviation from the scope and spirit thereof).

At any point during use of the graphical user interfaces, the user can stop the macro generation tool 18 and save the macro for later use, i.e., in the macro archive 20. The $I^2T$ 10 provides the means for the user to view a previously saved macro. This may be effected by a macro review tool (not shown), which may cause display of the macro on a display associated with the $I^2T$ 10. More specifically, the user will use the $I^2T$ to load the previously saved macro into the $I^2T$'s graphical user interface for macro viewing. The macro viewer (not shown) allows the user to view what functions are stored in the macro as well as the parameter values used by the functions.

If the user wishes, they have the capability to delete functions from the macro viewer as well as change parameter values. Since the macro is defined according to an XML schema, the macro can be used later on by tools outside the $I^2T$ 10 given that these tools have the knowledge of the macro xml schema and/or database definition.

Accessing the $I^2T$ macros through its API will result in tremendous productivity gains by eliminating duplicative and what are often complex programming and integration efforts.

Macros are generated based on the user interactions with the toolset's GUIs and stored according to the established rules, for example, in the proper xml elements. For example, the instrument being interacted with from the $I^2T$ tool may be stored in a Symbolic Name element. Each user interaction with the $I^2T$ is equivalent to a specific command for the related instrument. This command name may be stored in a Command/Name element. The parameters programmed by the user may be stored in a Parameter/Value element and the name of the parameter is stored in a Parameter Name element.

During macro playback, the instrument to be programmed is read from an Instrument/Name element and is selected. The $I^2T$ tool works in such a way that the instrument can be any of a similar type to the stored instrument; hence, the macro can be applied to many Automated Test Equipment (ATE) Systems. To accomplish this, when the commands are played back, the $I^2T$ tool will use the documented API for the instrument chosen to replicate the command(s) and parameter(s) stored in the macro. Once the macro is saved in the macro archive 20, a digital signature for the macro is recorded for configuration management and to maintain test integrity where necessary.

A key capability of $I^2T$ is the ability to generate or create tests and support documentation. To provide this capability, the architecture of the integrated application 10 is such that the test creation tool 22 utilizes the stored macro archive 20. The $I^2T$'s test creation tool 22 allows the user to create, generate and define tests to operatively test an electronic device through one or more of its graphical user interfaces. If the user requires the test being created to have stimulus signals sent to the unit under test, they can use one or more of the macros that they or someone else had previously defined using the I²T's macro generation tool that causes directing of stimulus signals to the unit under test. More generally, if the user requires the test being created to perform a specific function, the test creation tool 22 enables them to access one or more of the previously defined and saved macros in the stored macro archive 20 that cause this function to be performed During the creation of the test, the I²T's test creation tool 22 provides the ability to view any of the stored macros for use in the test. This viewing may be effected via display associated with the I²T. Visualization of the macros stored in the macro archive 20 increases development efficiency by allowing the user to select a close fit to their exact functional requirement and then make the necessary changes and save the macro as a new macro. Thus, the user is not limited only to those macros in the macro archive 20 but can retrieve a macro from the macro archive 20, modify it and then cause the modified macro to be saved or stored in the macro archive 20 to be later retrievable when desired.

The test creation tool 22 allows the user to sequence the play back or execution of the selected macros through its own graphical user interface. Through the GUI 12, the user can also choose from the acquisition and measurement macros stored for various signal analyzer's or other I²T's measurement tools. Once a function is selected, the test creation tool's graphical user interface will provide the user means to indicate what property of an electronic signal they wish to measure as well as parameters associated to the measurement function chosen. Through the GUI, the test creation tool 22 allows the user to establish test limits for the test being created. Accessing the I²T test creation tool 22 through its API will result in tremendous productivity gains by eliminating duplicative and what are often complex programming and integration efforts.

As the user defines tests through interaction with the GUI, information is stored according to the program rules in the proper xml elements of the I²T test Schema, an example of which is shown in FIG. 3. Via the test creation tool 22, the user defines the test by choosing which stored macros from the macro archive 20 should be run and in what order. For example, test number 44 may include macro 12, then macro 56, then macro 39. As an alternative, test number 45 can include the same macros but ordered differently, e.g., march 39, macro 12 and then macro 56. Accordingly, the test creation tool 22 allows the user to sequence the order of any number of the macros defined using the macro creation tool 18 and that have been stored in the macro archive 20.

As an example of the manner in which the macros may be stored in the macro archive 20, the macros can be stored using a Macro/Name element table in the data structure. During play back of the test including the macro, these elements let the I²T tool know how to program up the selected instruments to provide the proper signals for test execution. Through their GUI interactions, the user chooses what instrument to use to verify a signal for the test, and its name is stored in the Instrument/SymbolicName element. The user has the opportunity to choose from that particular instrument's API a function to verify the test signal. This information is stored in the form of a Measurement function/Name element table.

When a particular API, requires parameters to be passed to it, these parameters may be stored in the Parameter/Name and Parameter/Value element under the Measurement function element. This function may provide many parameters of the test signal to measure. So, the user is given the choice of which one of these measurement function parameters to measure. This parameter is stored in the Measurement Parameter/Name element. As the user defines the limits of the test, the limits are stored in the UpperLimit/Value and LowerLimit/Value elements. Once the macro is saved, a digital signature for the macro is recorded for configuration management and to maintain test integrity where necessary.

Referring again to FIG. 1, the I²T's test sequencer tool 26 allows the user to create and/or define test sequences used in testing of, such things as video devices, using a GUI. The I²T's test sequencer tool 26 allows the user to sequence tests defined or created by the I²T's test creation tool 22, and that have been saved in the test storage device 24 after their definition or creation by the test creation tool 22. During the test sequence through the graphical user interface, the user has the ability to add predefined tests from the test storage device 24 and remove tests from the sequence. Accessing the I²T test sequence tool 26 through its API will result in tremendous productivity gains by eliminating duplicative and what are often complex programming and integration efforts.

In one possible method of use, the user would be able to view or obtain an identification of the saved tests in the test storage device 24, and using a graphical user interface, select a plurality of tests to run and the sequence of this selected plurality of tests, i.e., the precise order in which the tests will be run. For example, test number 765, following by test number 44, followed by test number 76. As an alternative, the user can select the same tests but order them to be run in a different sequence, e.g., test number 76, following by test number 765, followed by test number 44. Accordingly, the test sequencer tool 26 allows the user to sequence the order of any number of the macro tests defined using the test creation tool 22 and that have been stored in the test storage device 24.

A key capability of I²T in accordance with the invention is the ability to generate sequences and support documentation. To provide this capability, the architecture of the integrated application is such that the test sequence tool 26, also considered as a test sequence generation tool, utilizes the stored tests that have been saved in the test storage device 24. Through their interactions with the GUI, each user defines the sequence of the test. The information about the sequence defined by the user interacting with the GUI, and involving the test sequence generation tool, is stored in the proper xml elements of the I²T Sequence schema shown in FIG. 4.

As the user adds a test to the sequence, the test information is stored in the proper xml elements in the sequence schema (resulting in variations of the schema shown in FIG. 4). The test order is stored in the sequence/test element. The order the tests are run in is the order that they appear in the xml data. Once the macro is saved, a digital signature for the macro is recorded for configuration management and to maintain test integrity where necessary.

As test sequences are played back, the results of each test are displayed within the test sequencer tool 26, e.g., on a display associated therewith, and stored as a XML memory object, or in another comparable memory format. The user has the option of exporting, printing or saving the XML result data, or test results in another format. The pass/fail test result status is determined by a decision engine, which is part of the test sequence tool 26, using predefined and/or predetermined conditions set through the GUI by the user. The decision engine will also enable the test sequencer tool 26 to conditionally execute and/or to terminate based on test results and user defined conditions set through the GUI. The test results unit 28 shown in FIG. 1 schematically represents one or more of a display on which the test results may be displayed, a test result storage device in which the test results may be stored, an export unit that is capable of exporting the test results, a printing device that is capable of printing the test results, and a memory device that is capable of saving the test results.

Additionally, I²T can process and log the test results using a test result data logger tool, also represented by the test results 28 schematically shown in FIG. 1. A test result data logger tool processes and records any macro or test script related decision criteria. The user can completely encapsulate a functional, parametric and/or diagnostic test program using the I²T toolset without writing or compiling any code.

Finally, the support document generation tool 30 processes the test result data from the test sequencer tool 26 or stored test result data from test results unit 28 to generate support documentation, including but not limited to flow charts and test diagrams. Support documentation is generated by the support document generation tool 30 by, for example, dynamically referencing flow chart or test diagram generation APIs.

Additional components of the I²T 10 include an electronic signal redisplay tool 32. Electronic signal redisplay tool 32 is a graphical user interface that allows the user to display a signal captured by a signal or waveform analyzer 34. The electronic signal redisplay tool 32 also has the ability to display various qualitative and quantitative properties of the captured waveform.

The tool and other components illustrated in FIG. 1 can be connected to one another, via output and input ports and connectors and other electronic device connection structure known to those skilled in the art, or integrated into a common processing unit to provide the system shown therein. If connections are provided, e.g., from the waveform analyzer 34 to the instrument programming tool GUI 12, the connections are generally cables, wires and the like. The separation of different tools and components into the blocks does not imply that the separate tools are components are physically separated from one another and two or more of the tools or components, although shown in different blocks, may be integrated into a common piece of electronic hardware or a common piece of software.

With the foregoing structure and method, the invention provides a reliable means for a user, and especially an inexperienced programmer, to accomplish useable programming code themselves. By using the I²T's graphical user interface, the user can record their interactions in one or more macros that will allow them to be played back reliably time and time again. The macros created, among other things, optimize test throughput and code generated by acquiring signals once, then analyze quantitatively and qualitatively many parametric points of interest and values in the acquired signals that characterize signal integrity, producing efficient code and optimized throughput. The tool in accordance with the invention is thus uniquely able to maximize throughput by programming only what needs to be programmed, thus eliminating unnecessary replication of set-up commands and acquisition cycles to instruments typically embedded by test engineers in manually generated automation code.

Figure 5:
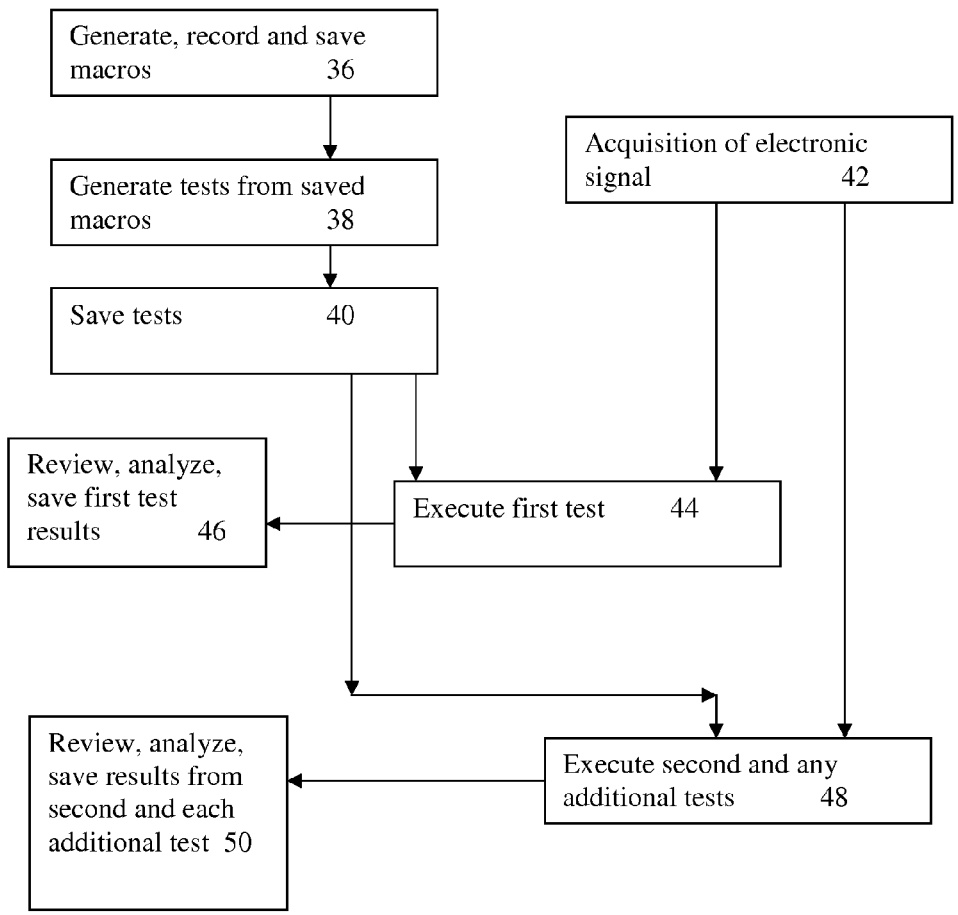
FIG. 5 is a flow chart of a method for analyzing an electronic signal in accordance with the invention.

This aspect may be referred to in brief as the "single acquisition/multiple test measurement analysis" technique, and a flow chart of this is shown in FIG. 5. In the outlined method for analyzing signals, the first step 36 is to generate a plurality of macros that each provides programming for at least one instrument that acts on an electronic signal. This generation may be achieved using the at least one graphical user interface tool 12 and the macro generation tool 18 (see FIG. 1). Other ways to generate macros are also possible and encompassed within the scope of the invention. Also, the macro generation may be performed at a moment in time before the signal analysis is to be performed. Further, the macros may be generated by different personnel than those creating the software program or analyzing the signals, and at the same or different locations, and thus using different graphical user interfaces or graphical user interface tools. Thus, the macro generation step may be temporally and spatially separated from the signal analysis.

After the macros have been generated in step 36, tests are created in step 38, each test including at least one of the generated macros. This step may be performed using the test creation tool 22 (see FIG. 1), or by any other tool or software component that is capable of designating macros to be run during execution of a test including the macros. Ideally, multiple tests are created, each typically including a different set of macros. In step 40, the generated tests are stored in a test storage device 24 (see FIG. 1).

Irrespective of the generation of the macros in step 36, creation of the tests in step 38 and storage of the tests in step 40, one or more electronic signals to be analyzed is acquired and stored in a memory component or other signal storage component, step 42. The manner in which an electronic signal can be acquired and the structure for acquisition, processing and storage of such a signal are known to those skilled in the art to which this invention pertains.

After at least one test has been saved in step 40 and at least one electronic signal acquired in step 42, a first test is executed at 44 and the test results can be reviewed, analyzed and saved in step 46.

An important advantage of the invention is the ability to also execute additional tests on the same acquired signal without necessitating re-acquisition of this electronic signal. Thus, in step 48, a second and possibly additional tests may also be executed on the same acquired electronic signal and the test results can be reviewed, analyzed and saved in step 50. The acquired electronic signal can be retrieved from a signal storage component each time a test or test sequence is sought to be executed on the signal.

In one embodiment, a sequence of tests is created including a plurality of the tests in an order in which they are to be executed, i.e., a test sequence. This may be achieved using the test sequencer tool 26 (see FIG. 1), which is also capable of creating multiple test sequences. Then, a test execution unit, or a processing unit, executes each test in the order in which they are presenting the test sequence, and on the same acquired signal. Thus, the tests results would be the results of multiple tests on the same acquired signal. Different test sequences may be created for different types of electronic signals.

Additional steps of the signal analysis method include those performed by the various tools described above in connection with the description of FIG. 1. Thus, for example, the method enables review of a macro being generated or macros that have previously been generated using the graphical user interface tool 12 and/or the macro generation tool 18, enables selection of one or more software tools to be used in the processing of the electronic signals, generates code for controlling the instrument(s) based on user interaction with the graphical user interface (via the code generation tool 14), and redisplay of the electronic signal on an electronic signal redisplay tool 32. Further, the macros may be recorded during their generation in real time via macro generation tool 18, saved in at least one memory component 20 so that the method can subsequently access the memory component 20 to retrieve one of the saved macros therefrom.

As mentioned above, the macros may include an identification of an instrument and a manner for programming the instrument, with the application program interface (API) 16 for the instruments stored in at least one driver memory component, or otherwise made available to the components of the tool 10. Access to the application program interface (API) 16 for the instruments during execution of the tests is made available such that during playback of a macro, identification of an instrument to be programmed is obtained and the application program interface (API) for the identified instrument is retrieved and applied. Further, the macros may include a parameter relating to operation or use of the instrument. When the instrument is a signal generator, the method allows for a change of the parameter included in the macro using the at least one graphical user interface directly linked to the API of the signal generator. Also, the user can select a computer language in which code is generated by linking to the API for code generation in the selected computer language.

Additional, optional aspects of the method include configuring the at least one graphical user interface to enable the user to specify at least one property of an electronic signal to analyze from a predetermined list of properties. When the instrument is a signal analyzer, the method may include configuring the at least one graphical user interface to enable the user to specify one or more limits for validation of the electronic signal to analyze by means of the signal analyzer. The user's interaction with the graphical user interface(s) may be recorded in a memory unit as a Data Object Model Document Object which is saved in a XML document or a database for subsequent use. Each graphical user interface may be configured to enable the user to specify the order for parsing the XML documents or databases in order to provide a sequence of stimulus signals and/or to analyze properties of electronic signals.

Figure 6:
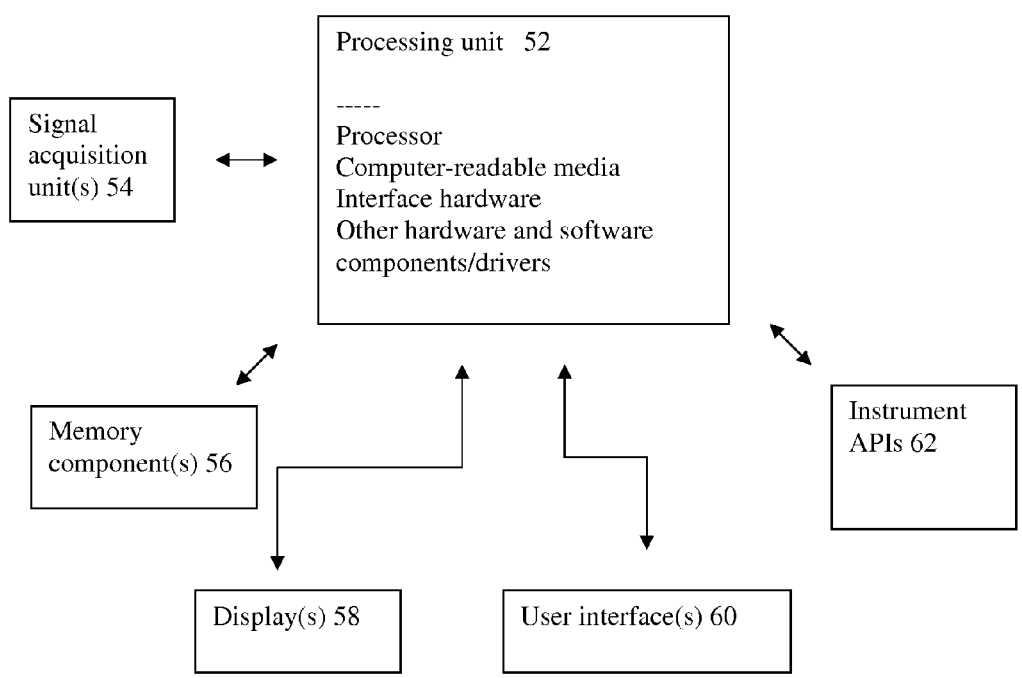
FIG. 6 is a schematic of an arrangement that is capable of implementing the method outlined in FIG. 5.

An arrangement that is capable of implementing the method outlined in FIG. 5 is shown in FIG. 6 and includes a processing unit 52. Processing unit 52 includes a processor, computer-readable media embodying computer programs, interface hardware and other hardware and/or software components or drivers that enable practice of the invention disclosed herein. The type of these components and their interconnection would be readily ascertainable by one skilled in the art to which this invention pertains without undue experimentation and/or in view of the disclosure herein. Processing unit 52 may also include the various tools described above.

Several additional components are connected to the processing unit 52. These components may be connected in a wired manner, or in a wireless manner to the processing unit 52 and may be situated at the same site as or remote from the processing unit 52. It is therefore possible for one or more of the components to be connected to the processing unit 52 via a communications network or the Internet, or other comparable network. The additional components may each be provided as a single component or several of the same type of components may be provided.

For example, the first component is a signal acquisition unit 54 and if desired, multiple signal acquisition units 54 may be provided, each capable of acquiring a different type of signal. The second component is a memory component 56. Multiple memory components 56 may be provided, possibly some separate from and some integral with the processing unit 52. The memory components 56 store the various macros, tests, test sequences and electronic signals being analyzed, as well as any other data or software requiring storage.

One or more displays 58 are also provided and display whatever needs display in the tool 10 or method, e.g., the electronic signal being acquired, the macros being generated by the macro generation tool 18, the code being generated by the code generation tool 14, the sequence of tests being created by the test sequencer tool 26, and the results of the tests 28.

One or more user interfaces 60 are also provided and enable the user to interact with the processing unit 52 to perform the functions recited above, e.g., create macros, create tests and sequence tests.

Finally, the instrument APIs 62 may be situated apart from the processing unit 52 but coupled thereto to enable access to the instrument APIs during execution of the tests, and more specifically, the macros in the tests.

As used herein, a graphical user interface or GUI may be defined as a software interface designed to standardize and simplify the use of computer programs, such as by using a computer mouse to manipulate text and images on a display screen featuring icons, windows, and menus.

As used herein, a software interrupt may be defined as an interrupt caused by a specific machine language operation code rather than by a hardware event. A software interrupt usually causes a processor to store the current state, store identifying information about the particular interrupt, and pass control to a first level interrupt handler.

As used herein, an application programming interface (API) is a particular set of rules ('code') and specifications that software programs can follow to communicate with each other. Often, an API serves as an interface between different software programs and facilitates their interaction, similar to the way a graphical user interface facilitates interaction between users and computers.

As used herein, the term "computer-aided software engineering" (CASE) refers to software used for automated development of systems software, i.e., computer code. The CASE functions include, but are not limited to, analysis, design and/or programming. Usually, CASE tools automate methods for designing, documenting and/or producing structured computer code in a desired programming language.

Algorithms that enable use of CASE tools are known to those skilled in the art, with any and all existing CASE tools being incorporated by reference herein, and appropriate tools for use in the invention may be derived and/or applied by those skilled in the art in view of the disclosure herein.

As used herein, a tool or a software tool is usually defined to mean a program that aids in the development of other programs. A tool may assist a software or computer programmer in the design, code, compile, link, edit, or debug phases.

As used herein, a macro, often considered shorthand for a macroinstruction, is usually defined to mean an instruction that represents a sequence of instructions in abbreviated form.

Several computer programs resident on transitory or non-transitory computer-readable media may be used in the invention and their function and non-limiting location are mentioned above. In the context of this document, computer-readable media or medium could be any non-transitory means that can contain, store, communicate, propagate or transmit a program for use by or in connection with the method, system, apparatus or device. The computer-readable medium can be, but is not limited to (not an exhaustive list), electronic, magnetic, optical, electromagnetic, infrared, or semi-conductor propagation medium. The medium can also be (not an exhaustive list) an electrical connection having one or more wires, a portable computer diskette, a random access memory (RAM), a read-only memory (ROM), an erasable, programmable, read-only memory (EPROM or Flash memory), an optical fiber, and a portable compact disk read-only memory (CDROM). The medium can also be paper or other suitable medium upon which a program is printed, as the program can be electronically captured, via for example, optical scanning of the paper or other medium, then compiled, interpreted, or otherwise processed in a suitable manner, if necessary, and then stored in a computer memory. Also, a computer program or data may be transferred to another computer-readable medium by any suitable process such as by scanning the computer-readable medium.

Having thus described a few particular embodiments of the invention, various alterations, modifications, and improvements will readily occur to those skilled in the art. Such alterations, modifications and improvements as are made obvious by this disclosure are intended to be part of this description though not expressly stated herein, and are intended to be within the spirit and scope of the invention. Accordingly, the foregoing description is by way of example only, and is not limiting. The invention is limited only as defined in the claims and equivalents thereto.

What is claimed is:

1. An arrangement embodied at least partly in non-transitory computer readable media for developing a software program for use in generating, capturing and/or analyzing electronic signals, comprising:
    at least one graphical user interface tool, said at least one graphical user interface tool being controllable by a user via at least one graphical user interface interacting with a processor to select one or more software tools to be used in the processing of the electronic signals, said software tools including:
        a code generation tool that generates code for use in processing electronic signals and for controlling at least one instrument that acts upon the electronic signals based on user interaction with said at least one graphical user interface;
        an electronic signal redisplay tool that displays an electronic signal on a display;
        a waveform analyzer tool that enables analysis of an electronic signal;
        a macro generation and playback tool that enables, during use of said at least one graphical user interface tool and upon initiation by the user, generation of a macro that provides programming for an instrument that acts on an electronic signal and review of the macro being generated or macros that have previously been generated;
        a test creation tool that enables a plurality of different tests to be created, each test being created from a plurality of macros generated by said macro generation tool; and
        a test sequencer tool that enables a plurality of different sequences of tests to be run such that during playback of the macro in one of the tests to be run, identification of an instrument to be programmed is obtained and an application program interface (API) for the identified instrument is retrieved and applied; and
    a test result data logger that obtains results from tests run when a test sequence is applied to the processor.

2. The arrangement of claim 1, wherein said macro generation and playback tool is configured to record a generated macro in memory as a Document Object Model (DOM) Document as the macro recording is taking place in real time.

3. The arrangement of claim 1, further comprising a macro archive coupled to said macro generation and playback tool and that is configured to save a generated macro.

4. The arrangement of claim 1, wherein said macro generation and playback tool is configured to create the macro including the identification of the instrument and a manner for programming the instrument.

5. The arrangement of claim 4, wherein said macro generation and playback tool is configured to create the macro to further include a parameter relating to operation or use of the instrument such that during playback of a macro, the parameter is retrieved and applied.

6. The arrangement of claim 5, wherein the instrument is a signal generator and said macro generation and playback tool is further configured to enable change of the parameter included in the macro by means of said at least one graphical user interface directly linked to the API of the signal generator.

7. The arrangement of claim 1, wherein said macro generation and playback tool is configured to enable selection, using a user interface, of a computer language in which said code generation tool generates code by linking to the API for code generation in the selected computer language, the respective API for each of a plurality of predefined computer languages being identical.

8. The arrangement of claim 1, wherein said code generation tool is configured to use graphical user interface messaging technologies to find a graphical user interface that will display the generated code, and send the found graphical user interface the generated code to enable its display in real time.

9. The arrangement of claim 1, wherein the software program is for a video generator or a video analyzer, the user's interaction with said at least one graphical user interface being recorded in a memory unit as a Data Object Model Document Object, the Data Object Model Document Object being saved in a XML document or a database for subsequent use.

10. The arrangement of claim 9, wherein said at least one graphical user interface is configured to enable the user to change the software program being developed and that is being stored in the XML document or database.

11. The arrangement of claim 10, wherein said at least one graphical user interface is configured to enable the user to resave the XML document or database over itself or to create a new XML document or database.

12. The arrangement of claim 9, wherein said at least one graphical user interface is configured to enable the user to specify an order of execution programming instructions in the XML document or database in order to provide stimulus signals for an electronic device.

13. The arrangement of claim 1, wherein said at least one graphical user interface is configured to enable the user to specify at least one property of an electronic signal to analyze from a predetermined list of properties.

14. The arrangement of claim 1, wherein the software program is for a signal analyzer and said at least one graphical user interface is configured to enable the user to specify at least one limit for validation of an electronic signal to analyze by means of the signal analyzer.

15. The arrangement of claim 1, wherein the user's interactions with said at least one graphical user interface are recorded in a memory unit as a Data Object Model Document Object that is saved in a XML document or a database for subsequent use, said at least one graphical user interface being further configured to enable the user to specify in which order the XML documents or databases are parsed in order to provide a sequence of stimulus signals and/or to analyze properties of electronic signals.

16. A method for developing a software program for use in generating, capturing and/or analyzing electronic signals, comprising:
    controlling at least one graphical user interface tool via at least one graphical user interface and a processor to select one or more software tools to be used in the processing of an electronic signal, the software tools including a code generation tool, a macro generation and playback tool and a test creation tool;

generating code, using the code generation tool and the at least one graphical user interface, for use in processing electronic signals and for controlling at least one instrument that acts upon the electronic signals based on user interaction with the at least one graphical user interface;

generating using the macro generation and playback tool, a plurality of macros that each provides programming for at least one instrument that acts on the electronic signal;

generating using the test creation tool, a plurality of different tests, each test including at least one of the generated macros;

storing the generated tests in a test storage device;

acquiring the electronic signal and storing the acquired electronic signal in a memory component; and executing a plurality of the generated tests, that have been generated using the test creation tool and stored in the test storage device, on the electronic signal stored in the memory component by retrieving and applying an application program interface (API) and without requiring the electronic signal to be re-acquired after executing each test, whereby during playback of the macro in one of the tests being executed, identification of an instrument to be programmed is obtained and the API for the identified instrument is retrieved and applied, and whereby results of the executed tests can be analyzed.

17. The method of claim 16, further comprising enabling, using the at least one graphical user interface and the macro generation and playback tool, review of the macro being generated.

18. The method of claim 16, wherein the step of generating a plurality of macros comprises generating each macro using the macro generation and playback tool during use of the at least one graphical user interface tool and upon initiation by the user.

19. The method of claim 16, wherein the software tools further include a test sequencer tool, further comprising forming a plurality of sequences of tests using the test sequencer tool and the at least one graphical user interface, the step of executing the generated tests comprising executing at least one of the test sequences using a processor.

20. The method of claim 16, wherein the step of generating the macros comprises including in each macro the identification of an instrument and a manner for programming the instrument, further comprising:

recording macros during their generation in real time;

saving generated macros in at least one memory component;

subsequently accessing the memory component to retrieve one of the saved macros;

storing an application program interface (API) for instruments in at least one driver memory component; and enabling access to the application program interface (API) for instruments in the at least one driver memory component during execution of the tests, whereby during playback of a macro, identification of an instrument to be programmed is obtained and the API for the identified instrument is retrieved from the at least one driver memory component.

* * * * *

UNITED STATES PATENT AND TRADEMARK OFFICE
CERTIFICATE OF CORRECTION

PATENT NO. : 8,356,282 B1
APPLICATION NO. : 13/237304
DATED : January 15, 2013
INVENTOR(S) : William Harold Leippe et al.

Page 1 of 1

It is certified that error appears in the above-identified patent and that said Letters Patent is hereby corrected as shown below:

In the Claims:

Claim 17, Column 15, line 32, after "generated", insert --or macros that have been previously generated--.

Signed and Sealed this
Eighth Day of October, 2013

Teresa Stanek Rea
*Deputy Director of the United States Patent and Trademark Office*